United States Patent [19]
Tikkanen

[11] Patent Number: 5,848,416
[45] Date of Patent: Dec. 8, 1998

[54] METHOD AND APPARATUS FOR STORING AND RETRIEVING DATA AND A MEMORY ARRANGEMENT

[75] Inventor: Matti Tikkanen, Espoo, Finland

[73] Assignee: Nokia Telecommunications Oy, Espoo, Finland

[21] Appl. No.: 750,777

[22] PCT Filed: Jun. 5, 1995

[86] PCT No.: PCT/FI95/00319

§ 371 Date: Dec. 6, 1996

§ 102(e) Date: Dec. 6, 1996

[87] PCT Pub. No.: WO95/34155

PCT Pub. Date: Dec. 14, 1995

[30] Foreign Application Priority Data

Jun. 6, 1994 [FI] Finland ................................. 942663
Jun. 6, 1994 [FI] Finland ................................. 942664

[51] Int. Cl.$^6$ ........................................................ G06F 17/30
[52] U.S. Cl. ........................................................ 707/101
[58] Field of Search .................................. 707/1, 2, 3, 4,
707/5, 6, 100, 101, 102, 103, 104, 200,
531, 540; 341/51, 79, 65, 67, 87, 95, 106;
345/422; 395/13, 200.32, 709; 364/251.6,
282.1, 260.6, 708.1, 951.3, 964.28, 966.2

[56] References Cited

U.S. PATENT DOCUMENTS

| | | | |
|---|---|---|---|
| 5,058,144 | 10/1991 | Fiala et al. | 375/240 |
| 5,257,365 | 10/1993 | Powers et al. | 707/100 |
| 5,442,784 | 8/1995 | Powers et al. | 707/102 |
| 5,463,390 | 10/1995 | Whiting et al. | 341/51 |
| 5,521,597 | 5/1996 | Dimitri | 341/51 |
| 5,532,694 | 7/1996 | Mayers et al. | 341/67 |
| 5,564,045 | 10/1996 | Fulling et al. | 707/3 |
| 5,592,667 | 1/1997 | Bugajski | 707/102 |

*Primary Examiner*—Paul R. Lintz
*Assistant Examiner*—Ruay Lian Ho
*Attorney, Agent, or Firm*—Pillsbury Madison & Sutro LLP

[57] ABSTRACT

In methods for storing and retrieving data with a memory arrangement and central databases, a trie data structure is utilized in which the nodes are given unique multidimensional search keys in order to save memory space and to easily store and retrieve data, as a result, the efficiency of storage management will be highly improved.

26 Claims, 3 Drawing Sheets

METHOD AND APPARATUS FOR STORING AND RETRIEVING DATA AND A MEMORY ARRANGEMENT

This application is the national phase of international application PCT/FI95/00319 filed Jun. 5, 1995 which designated the U.S.

The approach in accordance with the invention is intended for use primarily in connection with central memory databases. A suitable application is the maintenance of a subscriber database in a telephone exchange.

The prior art unidimensional directory structure termed digital trie (the word "trie" is derived from the word "retrieval" in the English language) is the underlying basis of the principle of the present invention. The digital trie is a tree-like structure composed of two types of nodes: leaf nodes containing a record, and internal nodes guiding the retrieval. An internal node is an array having a size of two by the power of k ($2^k$) elements. If an element is in use, it refers either to an internal node at the next level in the directory tree or to a leaf node containing a record. In other cases, the element is free (empty). Conducting a search in the database proceeds by examining the search key (which in the case of a subscriber database in a telephone exchange, for instance, is typically the binary numeral corresponding to the telephone number of the subscriber) k bits at a time. The bits to be searched are selected in such a way that at the root level of the structure (in the first internal node), k leftmost bits are searched; at the second level of the structure, k bits next to the leftmost bits are searched, etc. The bits to be searched are interpreted as an unsigned binary integer that is employed directly to index the element array (the index indicates a given element in the array). If the element indicated by the index is free, the search will terminate as unsuccessful. If the element refers to an internal node at the next level, k next bits extracted from the search key are searched at that level in the manner described above. As a result of comparison, searching routine branches off either to an internal node at the next level or to a leaf node typically containing a key-pointer pair. If the element refers to a leaf node containing a record, the key stored therein is compared with the search key. The entire search key is thus compared only after the search has found a leaf node. Where the keys are equal, the search is successful, and the desired data unit is obtained at the storage address indicated by the pointer of the leaf node. Where the keys differ, the search terminates as unsuccessful.

Figure 1:
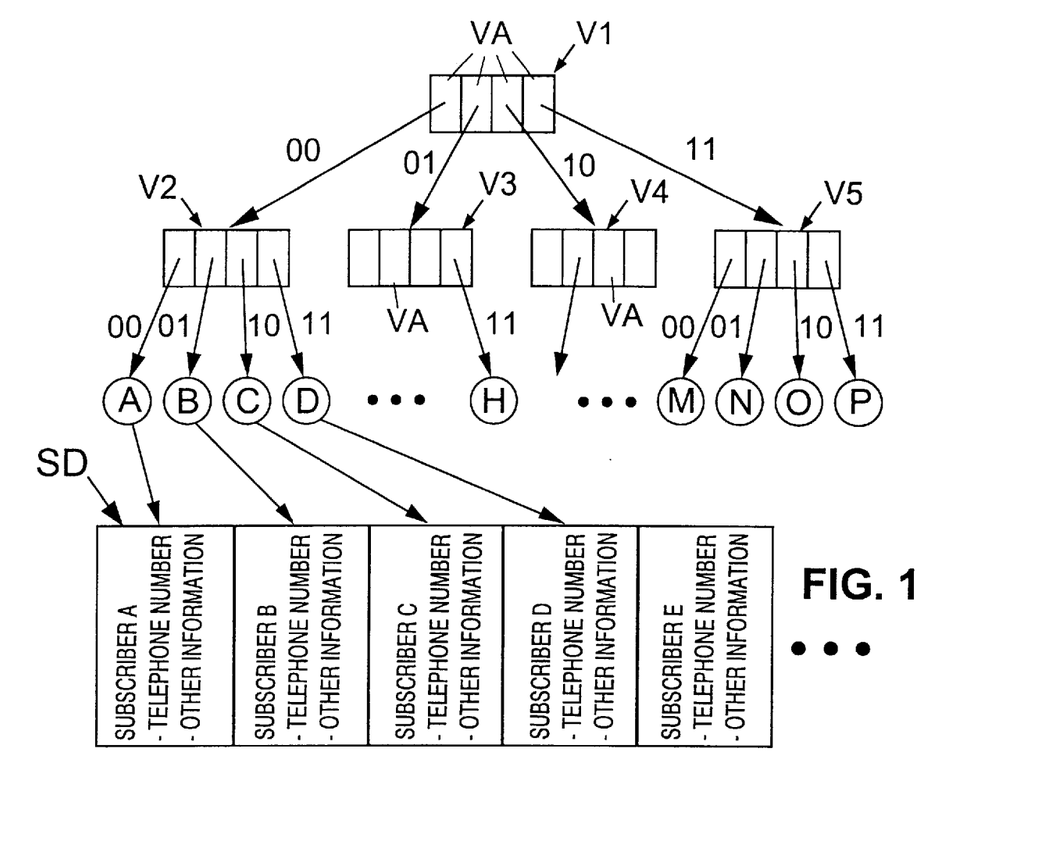
FIG. 1 illustrates the use of an unidimensional digital trie structure in the maintenance of subscriber data in a telephone exchange.

FIG. 1 illustrates an example of a digital trie structure in which the key has a length of 4 bits and k=2, and thus each internal node has $2^2=4$ elements, and two bits extracted from the key are searched at each level. Leaf nodes containing a record are denoted by references A, B, C, D. . . . . M, N, O and P. Thus, a leaf node is a node that does not point to a lower level in the tree. The internal nodes are denoted with references V1 . . . V5 and internal node elements with reference VA in FIG. 1.

In the exemplary case shown in FIG. 1, the search keys for the leaf nodes shown are as follows: A=0000, B=0001, C=0010, . . . , H=0111, . . . and P=1111. In this case, a pointer is stored in each leaf node to that storage location in the database SD at which the actual data, e.g. the telephone number of the pertinent subscriber and other information relating to that subscriber, is to be found. The actual subscriber data may be stored in the database, for instance as a sequential file of the type shown in the figure. The search is performed on the basis of the search key of record H, for example, by first extracting from the search key the two leftmost bits (01) and interpreting them, which delivers the second element of node V1, containing a pointer to node V3 at the next level. At this level, the two next bits (11) are extracted from the search key, thus yielding the fourth element of that node, pointing to record H.

Instead of a pointer, the leaf node may contain (besides a search key) an actual data file. Thus, for example, the data relating to subscriber A (FIG. 1) may be located in leaf node A, the data relating to subscriber B in leaf node B, etc. Thus, in the first embodiment (in which a key-pointer pair is stored in the leaf node), the digital trie structure serves as a directory structure only, and in the second embodiment (in which the key and the actual data are stored in the leaf node) it serves as an associative memory. (In an associative memory, the storage locations are identified on the basis of their contents.)

SUMMARY OF THE INVENTION

In the approach of the present invention, the search key is multidimensional in contrast to the above, that is, the search key comprises a number of attributes (for example the family name and one or more surnames of a subscriber), and thus $k_i$ search key bits of an attribute are searched at a time in each attribute (i is an index corresponding to an attribute).

Previously, the unidimensional trie structure described above has been expanded into a multidimensional "EXCELL" structure (abbreviation for the words "extendible cell"), which is designed to support searches relating to geometric applications for maximum efficiency. The EXCELL structure comprises cells partitioning the search space, and a separate directory part. The cell division is executed by recursive subdivision of the search space into two equal parts alternately in the direction of each axis of the search space. The result of the cell division is a multidimensional trie structure. The directory part is a grid in tabular form, wherein each grid element is equal to the smallest cell in the search space. The grid element points to a cell in the search space, and more than one grid element may point to one cell. (The EXCELL structure is described in Tamminen, M.: The EXCELL method for efficient geometric access to data, Helsinki 1981, Acta Polytechnica Scandinavica, Mathematics and Computer Science Series #34, to which the interested reader is referred for a more comprehensive exposition.)

Such a multidimensional trie structure, in which the cell size is dynamic (the directory part is doubled when data are entered into the structure), is attended by the problem of fast (exponential) growth of the directory part caused by certain kinds of (non-uniform) search key distribution. In consequence, the storage occupancy (memory circuit requirement) will increase inordinately and the efficiency (speed) of storage management will be impaired.

It is an object of the present invention to eliminate the problems described above and to provide a memory in which the directory part can be contained in a smaller storage space than hitherto and which will be easier to manage than previously. This object is achieved with the storage and retrieval methods of the invention, the storage method being characterized in its basic form by (a) selecting from the search key related to each dimension a predetermined dimension-specific number ($k_i$) of bits and forming therefrom a search word on the basis of which the address of the next node is sought from an internal node at the root level of the tree-shaped hierarchy, and proceeding to the respective next node, (b) selecting from the unselected bits in the search key related to each dimension a predetermined dimension-specific number ($k_i$) of bits and forming therefrom a search word with which the address of a further new node at a lower level is sought from the array of the node that has been accessed, (c) repeating step (b) until an empty element has been encountered or until the address of the new node at a lower level is the address of a leaf node, and (d) storing a pointer in the leaf node and the data unit at the storage location indicated by the pointer or alternatively storing the data unit in the leaf node.

The idea of the invention is to perform address computation in a multidimensional trie structure in such a way that a given predetermined number of bits is selected from each dimension independently of the other dimensions, a typical implementation being such that in order to calculate one element array index, an unequal number of bits is selected from the search keys of the different dimensions. Hence a fixed limit independent of the other dimensions is set for each dimension in an individual internal node in the trie structure, by predetermining the number of search key bits to be searched in each dimension. Thus, the selection in each dimension is independent of the selections in the other dimensions. This course of action avoids excessive growth of the structure in the lateral direction on the one hand (the size of the internal node has an upper limit), and excessive growth of the structure in depth in the direction of any of the dimensions on the other hand (depth, i.e. the number of levels in each dimension, is equal to the total length of the search key in bits divided by the number of bits to be searched at a time, i.e., also the depth can be influenced by a parameter determining the size of the internal node). Since the directory can thus be given specific limits in the lateral and depth directions in advance, storage requirement will also be curbed.

With the approach of the invention, the need for memory circuits in the hardware will be smaller than heretofore, and the storage management will be effective, particularly when the distribution of the values of the search keys is known in advance (which is typically the case in a telephone exchange, for instance).

Another advantage of the invention is that it is possible to design the structure (by selecting the parameters) so as to favour, besides full key retrievals, also partial key retrievals equitably in all directions. The method also permits retrievals in the directions of certain dimensions only, i.e. partial key retrievals, with maximum efficiency. These characteristics are of significance particularly in real-time databases requiring high speed. A further advantage in terms of speed is that the approach enables efficient parallel processing (in other words, if, for instance, the search branches off into two subtrees, each can be processed with a separate processor).

BRIEF DESCRIPTION OF THE DRAWINGS

In the following the invention and its preferred embodiments will be explained with reference to FIGS. 2 to 6 by way of examples in accordance with the accompanying drawings, in which.

DETAILED DESCRIPTION

Figure 2:
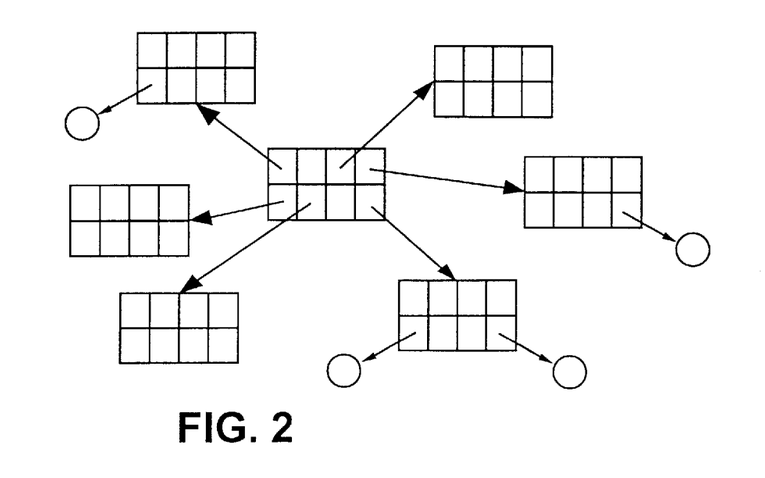
FIG. 2 illustrates a multidimensional trie structure.

As stated previously, in the present invention the trie structure has a multidimensional implementation (generally n-dimensional). Such a multidimensional structure is otherwise fully similar to the unidimensional structure described in the foregoing Background section with reference to FIG. 1, but the element array comprised in the internal node is multidimensional. FIG. 2 exemplifies a two-dimensional $2^2*2^1$ structure, in which one dimension in the element array comprises four elements and the other dimension two elements. Leaf nodes pointed to from the elements in the internal node are indicated by circles in the figure.

Address computation in the multidimensional case is performed on the same principle as in the unidimensional case. The fundamental difference, however, resides in that instead of one element array index, an index is calculated for each dimension in the element array (n indices). Each dimension thus has a search key space of its own $\{0, 1, \ldots, 2^{v_i}-1\}$ ($v_i$ is the length of the search key in bits in each dimension and $i \in \{1, \ldots n\}$).

In order to represent the configuration of an individual element VA in an internal node, it is first defined what is understood under the term overflow element. When a new pointer is added to the directory tree (as a result of data inserted into the memory), it may be at such a location in the internal node that already has a pointer referring to a leaf node. Such a situation is termed a collision. There are a wide variety of methods for resolving collision situations. In view of curbing memory requirement, it is no use creating a new internal node for the colliding pointer at the next level of the directory tree, but the pointer is located in the element of the colliding internal node if that node contains free elements. Such elements are called overflow elements, and they thus comprise pointers that are not located in accordance with the above straightforward address computation mechanism. In order that such records may be retrieved, the elements in the internal node must incorporate a separate identifier indicating the type of the pointer contained in the respective element, in other words, whether it refers to an internal node at the next level or to an overflow element (in the same internal node).

Figure 3:
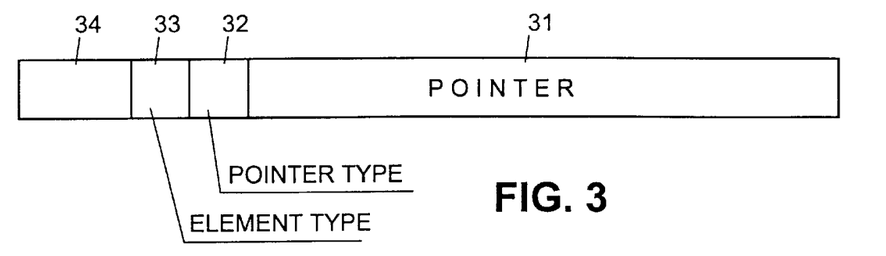
FIG. 3 illustrates the structure of an element in an internal node in the trie structure in accordance with the invention.

FIG. 3 exemplifies the structure of an element in the internal node in the directory structure of the memory in accordance with the invention. The internal node may be of the type directory node or overflow node. The type of the internal node is a directory node if it contains no overflow elements, and is an overflow node if it contains even one overflow element. An element, in turn, may be a directory element, an overflow element, or a free element (not in use). A directory element can refer to a directory node, overflow node, or leaf node. An overflow element, on the other hand, can only refer to an overflow node or to a leaf node.

Each element in this example has a length of 40 bits (5 bytes), comprising the following fields (length of field in parentheses): pointer field 31 (32 bits), pointer type field 32 (2 bits), and element type field 33 (2 bits). Furthermore, one vacant field 34 is left in the element. The type of the pointer can be encoded with the two bits of the pointer type field 32 for example as follows:

00: pointer not in use,
01: pointer to a directory node,
10: pointer to an overflow node, and
11: pointer to a leaf node.

The type of the element can be encoded with the two bits of the element type field for example as follows:

00: free element,
01: directory element,
10: overflow element, and
11: not in use.

In the multidimensional trie structure of the memory in accordance with the present invention, the size of each internal node (number of elements) is predetermined by fixing the parameter $k_1$ of each dimension (number of search key bits to be searched in the dimension) in advance on the basis of the desired size of an individual internal node in the direction of that dimension, and on the other hand on the desired depth of the structure in the direction of that dimension. The size of the internal node in the direction of each dimension is thus $2^{k_i}$ elements, and the total number S of elements in the internal node is also a power of two:

$$S = \Pi 2^{k_i} = 2^{k_1} \times 2^{k_2} \times 2^{k_3} \times \ldots = 2^N \qquad (1)$$

All elements in an internal node having n dimensions can thus be pointed to with n integers ($n \geq 2$), each of which can have a value between $\{0,1 \ldots 2^{k_i}-1\}$. Thus the predetermined parameters include the total length of the search key in each dimension and the number of bits searched in each dimension. If, for example, one dimension of a search key has 256 attributes (e.g. first names) at the most, the total length of the search key is 8 bits. If the number of bits to be searched at one time is selected to be, for instance, 1, the structure has a depth, of 8/1=8 in the direction of this dimension. By suitably selecting the number of searched bits in each dimension, for example depth can be set to be equal in all dimensions.

Hence, in accordance with the invention, the number of searched bits can differ in each dimension, and thus also the need for storage space can be controlled individually for each dimension.

Figure 4:
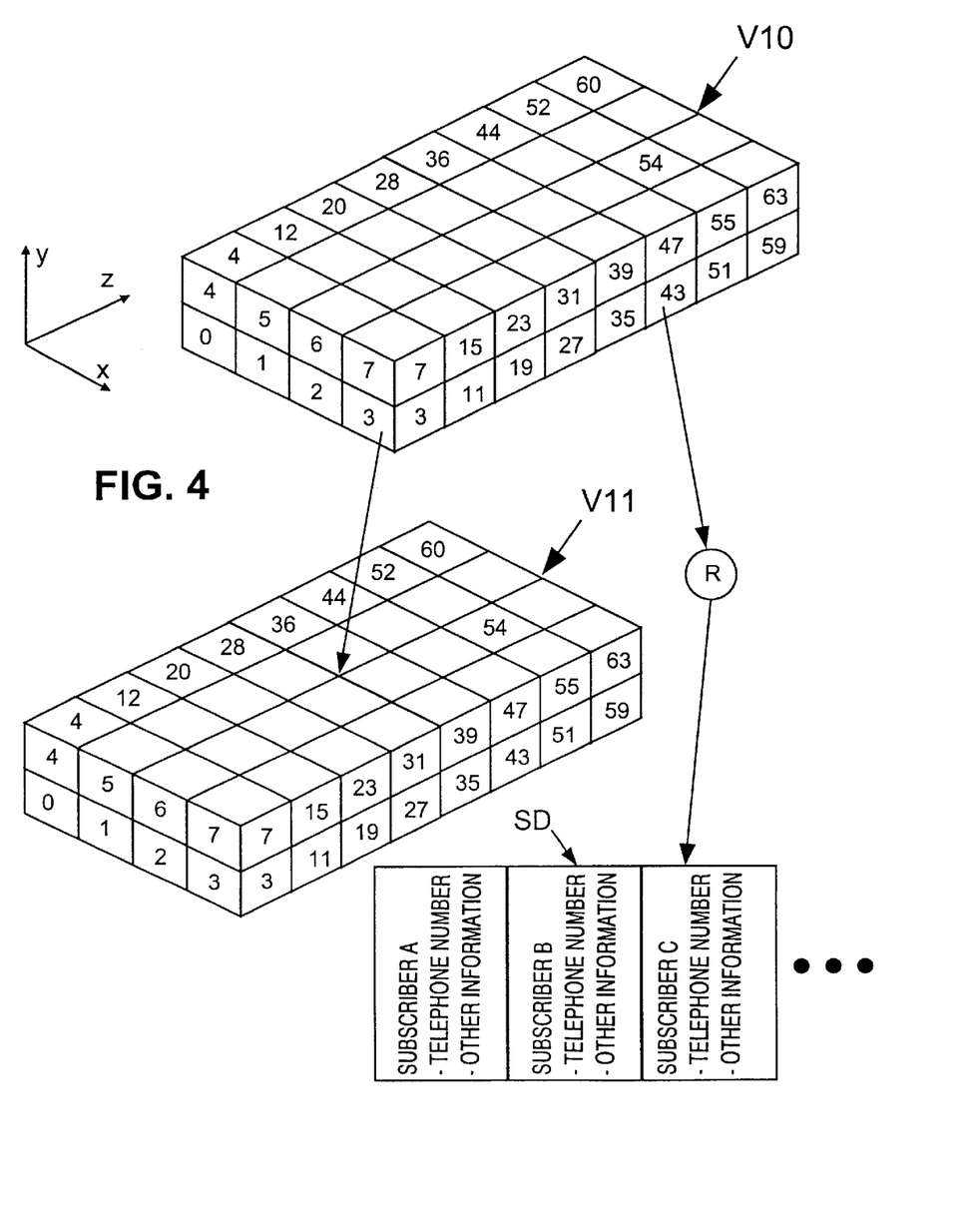
FIG. 4 illustrates nodes in the directory structure employed in the memory in accordance with the invention.

FIG. 4 shows an example of an internal node V10 used in the directory structure of the memory in accordance with the invention, employing a three-dimensional search key. In the direction of the first dimension (x), the internal node has $2^2=4$ elements, in the direction of the second dimension (y) it has $2^1=2$ elements, and in the direction of the third dimension (z) it has $2^3=8$ elements, which gives a total of $2^6=64$ elements numbered $0 \ldots 63$.

Since the memory space in practical hardware implementations (for example, computer equipment) is unidimensional, the multidimensional array is linearized, i.e. converted to be unidirectional, in the address computation operation (that is, in proceeding in the search tree). The linearization is an arithmetic operation that can be performed on arrays of all sizes.

In linearization, the elements in the array are numbered starting from zero (as shown in FIG. 4), the number of the last element being one less than the product of the sizes of all dimensions. The number of an element is the sum of the products of each coordinate (for example in the three-dimensional case, the x, y and z coordinates) and the sizes of the dimensions preceding it. The number thus computed is employed directly as an index for the unidimensional array.

In the case of the internal node shown in FIG. 4, the element number $VA_n$ is calculated in accordance with the above with the formula:

$$VA_n = x + y \times 4 + z \times 4 \times 2 \qquad (2)$$

where $x \in \{0,1,2,3\}$, $y \in \{0,1\}$ and $z \in \{0,1,2,3,4,5,6,7\}$. Thus, for example, for element 54 one obtains from the coordinates thereof (2,1,6): $2+1 \times 4+6 \times 4 \times 2=2+4+48=54$.

When the (n-dimensioned) element array of an internal node of an n-dimensional trie structure is linearized, in accordance with the above provided description the size of each dimension is $2^{k_i}$, where $k_i$ is the number of bits to be searched at a time in the dimension concerned. If a coordinate in accordance with the dimension is denoted by reference $a_j$ ($j \in \{0,1,2, \ldots n\}$), the linearization can be written out as $$\sum_{j=1}^{n} a_j \prod_{i=0}^{j-1} 2^{k_i}, \forall j: a_j \in \{0, 1, \ldots, 2^{k_j}-1\} \wedge k_0 = 0 \qquad (3)$$

The linearization can be carried out by performing a multiplication in accordance with formula (3); yet it is expedient to perform the linearization by forming from the search key bits a bit string, the corresponding numeral indicating the element whose content provides the basis for proceeding in the directory tree. In forming the bit string, the bits extracted from the search key of each dimension are set in succession, and the final bit string thus obtained is interpreted as a binary numeral. This gives the same result as formula (3).

Figure 5:
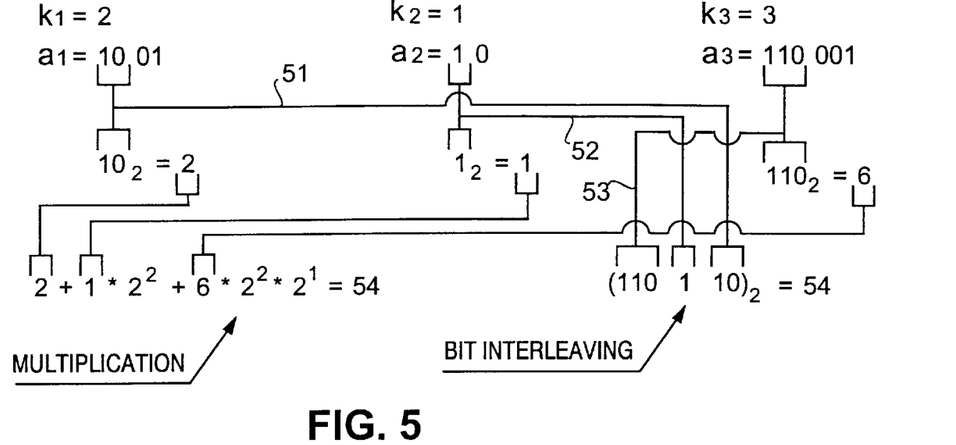
FIG. 5 illustrates ways in which an element in an internal node (an element array index) can be determined, the internal nodes being in accordance with FIG. 4.

FIG. 5 illustrates the linearization to be performed both by way of multiplication and by way of bit string formation in connection with the internal node shown in FIG. 4. As indicated previously, the numbers of search key bits to be interpreted in each dimension have been selected as follows: $k_1=2$, $k_2=1$ and $k_3=3$. The search keys in the direction of each dimension are as follows: $a_1=1001$, $a_2=10$, and $a_3=110001$. In forming the bit string, the two leftmost bits (10) of the search key $a_1$ in the first dimension (the first dimension is the one in the direction of which the numbering of the elements is commenced, starting from zero) are first extracted and taken as the least significant bits of the bit string to be formed. This is denoted by line 51. Next, the leftmost bit is extracted from the search key of the second dimension (line 52), and this bit is appended on the side of the most significant bits (left-hand side) into the bit string to be formed. Lastly, the three leftmost bits are extracted (110, line 53) from the search key of the third dimension, and these bits are inserted as the leftmost bits into the bit string. The resulting bit string (110110) is interpreted as a binary numeral, which will give access to element 54. The same element will be accessed also by way of multiplication in accordance with formula (3), but, in that case, the selected search key bits are interpreted first as a binary numeral, and coefficients for formula (3) are formed from the number thus obtained as shown in FIG. 5. On the basis of the pointer contained in element 54, the next internal node is accessed, wherein the same operation is repeated with the unused search key bits. (In the exemplary case, element $9=(001001)_2$ is selected from this internal node.) Each element in the internal node may refer either to another internal node (as element 3 to internal node V11) or to a leaf node containing a record (as element 43 to record R). In other cases, the element is not in use (is empty).

With bit string formation, the multiplication operations can be converted to addition operations and bit shifts (or to additions and bit-related OR operations). The mutual multiplication operations on numbers $2^{k_i}$ are replaced by addition operations on exponents $k_i$. The remaining multiplication of coordinate $a_j$ by a power of two will be converted to a bit shift operation by bit string formation (a multiplication by $2^k$ is known to correspond to a bit shift of k bits to the left). As multiplication will always take at least 13 clock cycles (with an Intel i486 processor, for instance), a bit shift can be performed in three clock cycles when the operands are stored in the processor register, in four clock cycles when the operands are to be found in the cache of the processor, and in ten clock cycles even in the case that the operands are to be retrieved from memory. Addition, on the other hand, will only take one clock cycle in the registers and otherwise 2–3 or 8–9 clock cycles depending on whether the operands are to be found in the cache of the processor.

The above-described method by which a bit string is formed is advantageous in that it is order-preserving (in other words, the records are organized in the structure in the order of the values of their search keys). This is due to the fact that $k_i$ most significant (left-most) bits are extracted from the search key at a time. However, in principle it is possible to form the bit string also in such a way that $k_i$ least significant (extreme right) bits are extracted from the search key.

The bit string may also be formed by treating the dimensions in a different order than above, yet the above method in which the bit string to be formed is increased on the left is the simplest, because in that case there is no need to know how many positions are to be assigned for the bits of each dimension in the bit string.

The multiplication in accordance with formula (3) may be employed for linearization (i.e., calculating an element array index) irrespective of the size of each dimension. On the other hand, bit string formation can only be employed where the size of the internal node (number of elements) in the direction of each dimension is a power of two. Since the internal node of the directory structure in accordance with the present invention meets this requirement, it is advantageous to employ the bit string-formation method in the retrieval and storage methods in accordance with the invention, which is a more efficient (rapid) method than the multiplication in accordance with formula (3). The rapidity is due to the fact that bit string formation will convert multiplications to additions and bit shifts, which are faster to perform.

A directory structure as set forth above may be varied, for example in such a way that a leaf node in the structure comprises more than one key-pointer pair. The difference then resides in that several search key comparisons instead of one comparison are performed in the leaf node.

Instead of a pointer, the record contained in the leaf node may comprise (besides the search key which is not indispensable) actual data. In this embodiment, the trie structure thus serves as an associative memory.

In principle, storage maintenance includes three different operations: retrieval, addition (storage), and deletion. When a record is to be added to actual data (subscriber data at a telephone exchange, for instance), the addition is made either directly to a leaf node or elsewhere in the memory. In the latter case, a pointer to the storage address at which the data record is stored is stored in the leaf node.

Hence the search proceeds in such a way that a predetermined dimension-specific number of bits ($k_i$) is selected from the search key related to each dimension, and a search word is formed from the bits in the above described manner, on the basis of which the element array index of the internal node at the root level is found. The element corresponding to the index will deliver the address of the next node, which is thus accessed. In the next node, a predetermined dimension-specific number of bits ($k_i$) is selected from among the unselected bits in the search key related to each dimension, and a search word is formed from these bits, employed for finding an internal node element. The selection of search key bits is continued until all bits in the search key have been selected or the address of a node at the next lower level is the address of a leaf node. Thereafter, either (a) the pointer contained in the leaf node is read from the leaf node and the record is read from the location indicated by the pointer, or (b) the one or more records contained in the leaf node are read. If an empty element is encountered in proceeding in the directory structure, the search is terminated as unsuccessful (in other words, it is known that no data associated with the relevant key is stored in the memory).

Hence in accordance with the invention a predetermined dimension-specific number of bits ($k_i$) is selected from the unselected bits of the search key related to each dimension. In each dimension, the number to be selected is independent of the number selected in the other dimensions, and the number to be selected remains constant in the same dimension.

When data are inserted, the search proceeds in the directory structure on the basis of a search key in a similar manner until an empty element is encountered or until the address of a new node at a lower level is the address of a leaf node.

In the former case, a leaf node is created and the free element is set to point to this leaf node. Thereafter, the data are inserted either directly into the leaf node or elsewhere in the memory; in the last-mentioned case, a pointer to the storage address at which the added record was stored is stored in the leaf node.

In the latter case, a leaf node already existing, the situation depends on whether the leaf node contains any space for an insertion (in other words, the situation depends on the size of the leaf node). If, for example, only one record will fit into the leaf node (or the leaf node is otherwise full), the depth of the directory structure must be increased. In that case, the element at the point of collision is set to refer to a new node in which element array indices are calculated for the keys. Adding of a new node is repeated if the indices are still equal. Thus, the addition of a new node is repeated so many times that the indices are unequal. This is accomplished by means of identifying search keys at the latest when all bits in the search key are employed, i.e. when the depth of the structure has reached its maximum. If there is space in the leaf node, the pointer or the actual data record is stored in the overflow element of the leaf node. If a pointer is stored in the overflow element, it will again point to the storage address at which the actual data record is stored. The overflow possibility may only be realized in a leaf node of the directory structure.

Deletion of data is performed in a manner known per se by finding, on the basis of the search key, the node containing a reference to a pointer or record to be deleted, as described above. If possible, the node is freed in order that storage space occupancy may be maintained at a minimum all the time. Freeing is possible, for example where the node contains one pointer to a leaf node and no pointer to a node at a lower level.

The collision-prevention strategy to be chosen in each particular case usually has an effect not only on the insertion operations but also on how the retrieval and deletion operations are to be performed. Thus, the details of the implementation of these operations can vary, even though in all of them progress is made by the address computation method of the present invention. Since, however, such a variation is not relevant to the actual inventive idea and since the variation will take forms known to those skilled in the art, it will not be more closely explained in this context.

Figure 6:
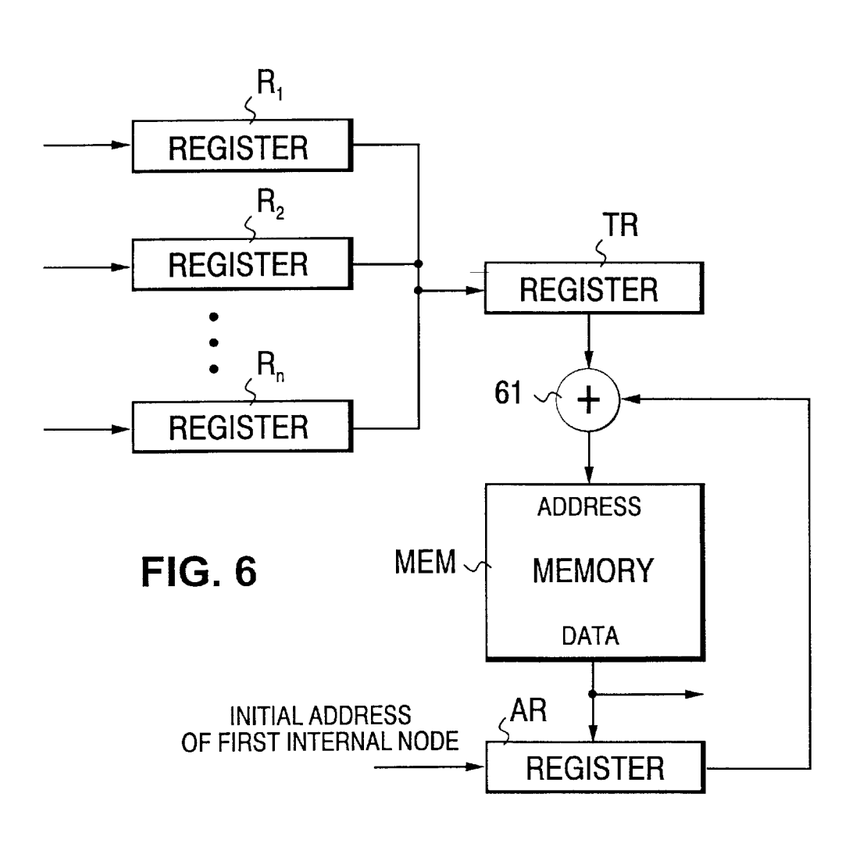
FIG. 6 illustrates a memory arrangement in accordance with the invention on block diagram level.

FIG. 6 shows a memory in accordance with the invention on block diagram level. Each dimension has a dedicated input register, and hence there are n input registers. The search key of each dimension is stored in these input registers, each key in a register of its own. The input registers are connected to register TR in which the above-described search word is formed. The register TR is connected via adder 61 to the address input of memory MEM. The output of the memory in turn is connected to address register AR the output of which in turn is connected to adder 61. Initially the bits selected from each register are read into the common register TR in the correct order. The initial address of the first internal node is stored in the address register AR, and the address obtained as an offset address from register TR is added to the initial address in adder 61. The resulting address is supplied to the address input of the memory MEM, and the data output of the memory provides the initial address of the next internal node, the address being written into the address register AR over the previous address stored therein. Thereafter the next selected bits are again loaded from the input registers into the common register TR in the correct order, and the array address thus obtained is added to the initial address of the relevant array (i.e., internal node), obtained from the address register AR. This address is supplied to the address input of the memory MEM, the data output of the memory thereafter providing the initial address of the next internal node. The above-described procedure is repeated until the desired position has been accessed and recordal can be performed or the desired register read.

The rapidity of the method of the invention can be influenced by the type of hardware configuration chosen. Since progress is by way of the above-stated bit manipulations, by selecting a given dimension-specific number of bits at a time from the search key of each dimension, address computation can be sped up by shifting from use of one processor to a multiprocessor environment in which parallel processing is carried out. An alternative to the multiprocessor environment is an ASIC circuit.

In the above, the structure of the memory has been described in the form that it will typically assume in implementation. In practice, nonetheless, one leaf node is first created from all nodes, and only after that first leaf node has overflown is the first internal node created, and the above-described directory structure will start taking shape. Thus, in principle, it is even possible to realize address computation of the above-described kind in one very large leaf node (that will never overflow) that comprises a multidimensional array, one element in the array thus containing—if it is in use—a data unit or a pointer to a data unit. Hence, in this case, only the first $k_i$ bits are selected from the search key of each dimension. If the element found by means of these bits is empty, either an actual data record or a pointer to that storage address at which the data record is stored is stored in the element. If a collision situation arises in the storage, it will be resolved by methods known per se. Such a one-leaf embodiment may in practice be feasible if the distribution of stored data is appropriate. The efficiency of storage space utilization, however, is inferior to that of the basic embodiment disclosed above, which has a multidimensional directory structure.

The one-leaf additional embodiment described above is, in a sense, a special case of a possible embodiment which also has a multidimensional directory structure, but along with that, address computation is continued in the leaf node as well, as has been described previously (provided that unsearched bits still exist). In that case, a leaf node has a structure similar to that of an internal node.

Even though the invention has been explained in the above with reference to examples in accordance with the accompanying drawings, it is obvious that it is not to be so restricted, but it can be modified within the scope of the inventive idea disclosed above and claimed in the appended claims.

I claim:

1. A method for storing data identifiable by a search key in memory, the data being stored as data units in a dedicated storage space assigned for each data unit, wherein storage is performed by proceeding, on the basis of a search key associated with the data unit to be stored, in a directory structure comprising a tree-shaped hierarchy having nodes at several different levels, wherein an individual node can be an internal node comprising a multidimensional array wherein an individual element may contain the address of a lower node in the tree-shaped hierarchy and wherein an individual element may also be empty, or a leaf node containing at least one pointer to a stored data unit, the steps of:

(a) selecting from the search key related to each dimension a predetermined dimension-specific number ($k_i$) of bits and forming therefrom a search word on the basis of which the address of the next node is sought from the internal node at the root level of the tree-shaped hierarchy, and proceeding to said node, (b) selecting from the unselected bits in the search key related to each dimension a predetermined dimension-specific number ($k_i$) of bits and forming therefrom a search word with which the address of a further new node at a lower level is sought from the array of the node that has been accessed, (c) repeating step (b) until an empty element has been encountered or until the address of the new node and at a lower level is the address of a leaf node, (d) storing a pointer in the leaf node and said data unit at the storage location indicated by the pointer.

2. A method as claimed in claim 1, wherein: a new leaf node wherein storage is performed is created after step (c).

3. A method as claimed in claim 1, wherein: said dimension-specific number ($k_i$) is selected in such a way that the structure has equal depth in the direction of all dimensions and hence will favor partial key retrievals equitably in all directions.

4. A method as claimed in claim 1, wherein: said dimension-specific number ($k_i$) is selected in such a way that the structure has greater depth in the direction of a given dimension/given dimensions and hence will favor partial key retrievals in that direction/those directions.

5. A method as claimed in claim 1, wherein: the search word is formed by setting the bits selected from the search key of each dimension in succession and interpreting the bit string thus obtained as a number indicating in the array of the internal node the element wherefrom the address of a lower node is sought.

6. A method for storing data identifiable by a search key in memory, the data being stored as data units in a dedicated storage space assigned for each data unit, wherein storage is performed by proceeding, on the basis of a search key associated with the data unit to be stored, in a directory structure comprising a tree-shaped hierarchy having nodes at several different levels, wherein an individual node can be an internal node comprising a multidimensional array wherein an individual element may contain the address of a lower node in the tree-shaped hierarchy and wherein an individual element may also be empty, or a leaf node in which at least one data unit is stored, comprising the steps of:

(a) selecting from the search key related to each dimension a predetermined dimension-specific number (k$_i$) of bits and forming therefrom a search word on the basis of which the address of the next node is sought from the internal node at the root level of the tree-shaped hierarchy, and proceeding to said node, (b) selecting from the unselected bits in the search key related to each dimension a predetermined dimension-specific number (k$_i$) of bits and forming therefrom a search word with which the address of a further new node at a lower level is sought from the array of the node that has been accessed, (c) repeating step (b) until an empty element has been encountered or until the address of the new node at a lower level is the address of a leaf node, and (d) storing said data unit in the leaf node.

7. A method as claimed in claim 6, wherein: a new leaf node wherein storage is performed is created after step (c).

8. A method as claimed in claim 6, wherein: said dimension-specific number (k$_i$) is selected in such a way that the structure has equal depth in the direction of all dimensions and hence will favor partial key retrievals equitably in all directions.

9. A method as claimed in claim 6, wherein: said dimension-specific number (k$_i$) is selected in such a way that the structure has greater depth in the direction of a given dimension/given dimensions and hence will favor partial key retrievals in that direction/those directions.

10. A method as claimed in claim 6, wherein: the search word is formed by setting the bits selected from the search key of each dimension in succession and interpreting the bit string thus obtained as a number indicating in the array of the internal node the element wherefrom the address of a lower node is sought.

11. A method for retrieving data identifiable by a search key from memory, the data being stored as data units in a dedicated storage space assigned for each data unit, wherein retrieval is performed by proceeding on the basis of a search key in a directory structure comprising a tree-shaped hierarchy having nodes at several different levels, wherein an individual node can be an internal node comprising a multidimensional array wherein an individual element may contain the address of a lower node in the tree-shaped hierarchy and wherein an individual element may also be empty, or a leaf node containing at least one pointer to a stored data unit, comprising the following steps of:

(a) selecting from the search key related to each dimension a predetermined dimension-specific number (k$_i$) of bits and forming therefrom a search word on the basis of which the address of the next node is sought from the internal node at the root level of the tree-shaped hierarchy, and proceeding to said node, (b) selecting from the unselected bits in the search key related to each dimension a predetermined dimension-specific number (k$_i$,) of bits and forming therefrom a search word with which the address of a further new node at a lower level is sought from the array of the node that has been accessed, (c) repeating step (b) until an empty element has been encountered, until the address of the new node at a lower level is the address of a leaf node or until all bits of the search key have been selected, and if an empty element was not encountered in step (c), (d) reading from the leaf node the pointer contained therein and reading the data unit at the location indicated by the pointer.

12. A method as claimed in claim 11, wherein: said dimension-specific number (k$_i$) is selected in such a way that the structure has equal depth in the direction of all dimensions and hence will favor partial key retrievals equitably in all directions.

13. A method as claimed in claim 11, wherein: said dimension-specific number (k$_i$) is selected in such a way that the structure has greater depth in the direction of a given dimension/given dimensions and hence will favour partial key retrieval in that direction/those directions.

14. A method as claimed in claim 11, wherein: the search word is formed by setting the bits selected from the search key of each dimension in succession and interpreting the bit string thus obtained as a number indicating in the array of the internal node the element wherefrom the address of a lower node is sought.

15. A method for retrieving data identifiable by a search key from memory, the data being stored as data units in a dedicated storage space assigned for each data unit, wherein retrieval is performed by proceeding on the basis of a search key in a directory structure comprising a tree-shaped hierarchy having nodes at several different levels, wherein an individual node can be an internal node comprising a multidimensional array wherein an individual element may contain the address of a lower node in the tree-shaped hierarchy and wherein an individual element may also be empty, or a leaf node in which at least one data unit is stored, comprising the steps of:

(a) selecting from the search key related to each dimension a predetermined dimension-specific number (k$_i$) of bits and forming therefrom a search word on the basis of which the address of the next node is sought from the internal node at the root level of the tree-shaped hierarchy, and proceeding to said node, (b) selecting from the unselected bits in the search key related to each dimension a predetermined dimension-specific number (k$_i$) of bits and forming therefrom a search word with which the address of a further new node at a lower level is sought from the array of the node that has been accessed, (c) repeating step (b) until an empty element has been encountered, until the address of the new node at a lower level is the address of a leaf node or until all bits of the search key have been selected, and if an empty element was not encountered in step (c), (d) reading from the leaf node one or more data units contained therein.

16. A method as claimed in claim 15, wherein: said dimension-specific number (k$_i$) is selected in such a way that the structure has equal depth in the direction of all dimensions and hence will favor partial key retrievals equitably in all directions.

17. A method as claimed in claim 15, wherein: said dimension-specific number (k$_i$) is selected in such a way that the structure has greater depth in the direction of a given dimension/given dimensions and hence will favor partial key retrievals in that direction/those directions.

18. A method for storing data identifiable by a search key in memory, the data being stored as data units in a dedicated storage space assigned for each data unit, wherein storage is performed by proceeding, on the basis of a search key associated with the data unit to be stored, in a directory structure having one node comprising a multidimensional array wherein an individual element may contain a pointer to a data unit or wherein an individual element may also be empty, comprising the steps of:

selecting from the search key related to each dimension a predetermined dimension-specific number ($k_i$) of bits and forming therefrom a search word on the basis of which an element is sought from the array of the node, and if said element is empty, storing a pointer in the element and said data unit at the storage location indicated by the pointer.

19. A method as claimed in claim 18, wherein: the search word is formed by setting the bits selected from the search key of each dimension in succession and interpreting the bit string thus obtained as a number indicating said element.

20. A method for storing data identifiable by a search key in memory, the data being stored as data units in a dedicated storage space assigned for each data unit, wherein storage is performed by proceeding, on the basis of a search key associated with the data unit to be stored, in a directory structure having one node comprising a multidimensional array wherein an individual element may contain a data unit or wherein an individual element may also be empty, comprising the steps of:

selecting from the search key related to each dimension a predetermined dimension-specific number ($k_i$) of bits and forming therefrom a search word on the basis of which an element is sought from the array of the node, and if said element is empty, storing the data unit in said element.

21. A method as claimed in claim 20, wherein: the search word is formed by setting the bits selected from the search key of each dimension in succession and interpreting the bit string thus obtained as a number indicating said element.

22. A method for retrieving data identifiable by a search key from memory, the data being stored as data units in a dedicated storage space assigned for each data unit, wherein retrieval is performed by proceeding, on the basis of a search key associated with the data unit to be stored, in a directory structure having one node comprising a multidimensional array wherein an individual node may contain a pointer to said data unit or wherein an individual node may also be empty, comprising the steps of:

selecting from the search key related to each dimension a predetermined dimension-specific ($k_i$) number of bits and forming therefrom a search word on the basis of which an element is sought from the array of the node, and if said element is empty, storing a pointer in said element and the data unit at the storage location indicated by the pointer.

23. A method as claimed in claim 22, wherein: the search word is formed by setting the bits selected from the search key of each dimension in succession and interpreting the bit string thus obtained as a number indicating said element.

24. A method for retrieving data identifiable by a search key from memory, the data being stored as data units in a dedicated storage space assigned for each data unit, wherein retrieval is performed by proceeding, on the basis of a search key associated with the data unit to be stored, in a directory structure having one node comprising a multidimensional array wherein an individual element may contain a data unit or wherein an individual element may also be empty, comprising the steps of:

selecting from the search key related to each dimension a predetermined dimension-specific number ($k_i$) of bits and forming therefrom a search word on the basis of which an element is sought from the array of the node, and if said element is empty, storing the data unit in said element.

25. An associative memory arrangement for storing data in electrical form, the data being stored as data units in a dedicated storage space assigned for each data unit in the memory, the memory arrangement comprising a directory structure which is a multidimensional digital trie structure comprising a tree-shaped hierarchy having nodes at several different levels, wherein a node can be an internal node comprising a multidimensional array wherein an individual non-empty element comprises a pointer (31) guiding progress in the directory structure, or a leaf node containing one or more pointers to a data unit stored in the memory, each data unit to be stored in the memory being associated with a multidimensional search key comprising a search key for each dimension, on the basis of which search keys progress is made in the directory structure, the directory structure returning the data unit associated with the multidimensional search key employed in each case, wherein: the size of an individual multidimensional internal node in the directory structure has been fixed by predetermining the number of search key bits $k_i$ to be searched in each dimension independently of the other dimensions, the size of the internal node in each dimension being $2^{k_i}$.

26. An associative memory arrangement for storing data in electrical form, the data being stored as data units in a dedicated storage space assigned for each data unit in the memory, the memory arrangement comprising a directory structure which is a multidimensional digital trie structure comprising a tree-shaped hierarchy having nodes at several different levels, wherein a node can be an internal node comprising a multidimensional array wherein an individual non-empty element comprises a pointer (31) guiding progress in the directory structure, or a leaf node containing at least one data unit, each data unit to be stored in the memory being associated with a multidimensional search key comprising a search key for each dimension, on the basis of which search keys progress is made in the directory structure, the directory structure returning the data unit associated with the multidimensional search key employed in each case, wherein: the size of an individual multidimensional internal node in the directory structure has been fixed by predetermining the number of search key bits $k_i$ to be searched in each dimension independently of the other dimensions, the size of the internal node in each dimension being $2^k$.

* * * * *